C. N. ACKERMAN.
SCREW HOLDING INSERT.
APPLICATION FILED MAR. 7, 1914.
1,137,443.
Patented Apr. 27, 1915.
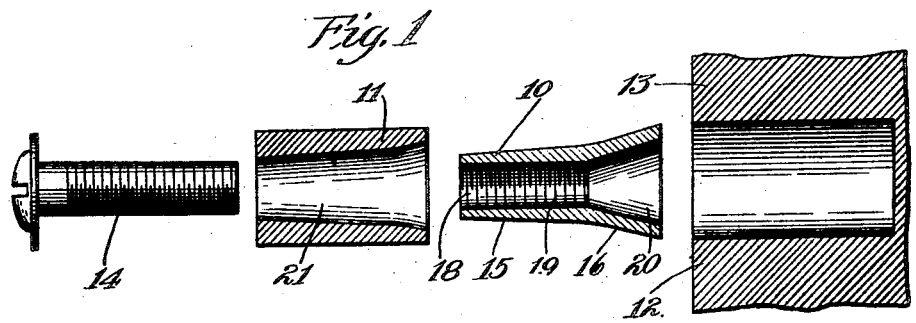
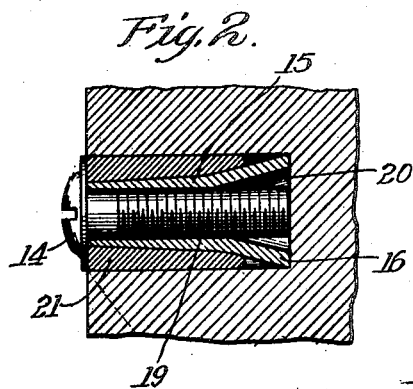
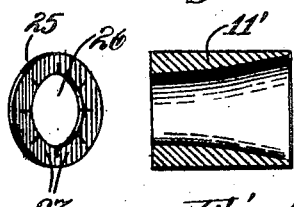
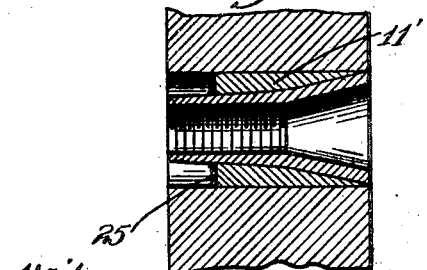
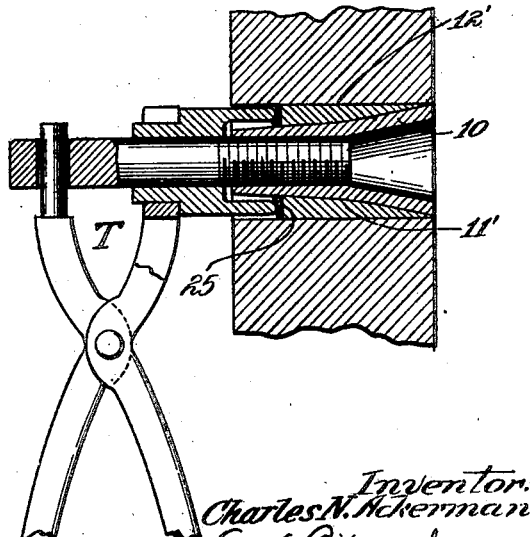
Witnesses:
Robert H. Weir
Arthur W. Carlson
Inventor:
Charles N. Ackerman
by George Barnaway
Attorney

UNITED STATES PATENT OFFICE.

CHARLES N. ACKERMAN, OF CHICAGO, ILLINOIS.

SCREW-HOLDING INSERT.

1,137,443.　　　　Specification of Letters Patent.　　Patented Apr. 27, 1915.

Application filed March 7, 1914. Serial No. 823,199.

*To all whom it may concern:*

Be it known that I, CHARLES N. ACKERMAN, a citizen of the United States, residing at Chicago, in the county of Cook and State of Illinois, have invented certain new and useful Improvements in Screw-Holding Inserts, of which the following is a specification.

My invention relates to an improved screw-holding insert, adapted for self retention in an aperture or recess, formed to receive it, in a supporting base.

One of the objects of my invention is to provide an interiorly threaded screw-receiving element, and a ductile bushing therefor adapted jointly to coöperate with the walls of a proper recess or aperture in a suitable base to retain the screw receiving member in fixed position therein.

A further object of my invention is to provide a construction wherein the screw receiving member may readily be set flush with the surface of the base, and also to provide a construction such that the screw-draft may take effect from the extreme outwardly-presented end of the screw-receiving element, thereby making the structure effective in taking and holding screws of minimum length.

Another object of my invention is to provide a screw receiving structure which will accurately seat on the bottom of the base-recess and will take a screw for its full length, unaffected by the presence of dust particles or the like in the base recess.

A further object of my invention is to provide means for retaining the insert in an opening against danger of rearward displacement.

Other and further objects of my invention will become apparent to those skilled in the art from the following description taken in conjunction with the accompanying drawings wherein I have shown a simple embodiment of my invention for purposes of full disclosure thereof, although it will be understood that many changes in details of construction might be made without departure from the spirit of my invention, and within the scope of the appended claims.

In the drawings Figure 1 shows in extended cross sectional fashion, a base, screw receiving member, ductile sleeve, and (in elevation) a screw. Fig. 2 shows the parts in assembled and fixed relation. Fig. 3 shows, relatively, a bushing and retainer. Fig. 4 shows an insert being set in an open hole to be held by the bushing and retainer. Fig. 5 shows such device completely set.

In the preferred embodiment of my invention shown I provide a screw receiving member 10 and a ductile sleeve 11, for coöperation with the walls of a recess or aperture 12 in a base 13 and adapted to coöperate with any suitable screw, indicated at 14.

The screw receiving member 10 tapers, or varies in exterior diameter, being smaller at its forward end than at its rear end. One advantageous shape that may be given the member 10 is indicated in Fig. 1, wherein the exterior surface is double tapered, or biconoidal, that is to say its base portion is tapered forward rather abruptly, and near the mid-length of the insert its surface merges into a more acute conoidal surface; such configuration providing the gradual forward taper 15 and the more accentuated or abrupt bottom taper 16.

The screw receiving member is provided with a central bore 18 extending from end to end thereof, and open at both ends. The forward portion of the bore is of uniform diameter and preferably screw threaded, as shown at 19. In the wider flared portion 16 of the member the bore is enlarged, preferably flaringly as at 20, so that the base-end of the structure is a narrow annulus.

For coöperation with the member 10 I provide a ductile sleeve of any suitable character, generally indicated at 11. Such a sleeve may take various forms, and the parts may be made of various metals, but I prefer that the member 10 shall be of brass or steel and the sleeve 11 of lead. Preferably the sleeve 11 is exteriorly of cylindrical form, substantially of equal diameter with the base of the member 10 and interiorly it is provided with a bore 21 so that it may pass over the forward portion of the member 10. Preferably, also, I shape the sleeve 11 interiorly in substantial conformity with the exterior contour of the member 10, and make it of such normal length that when placed on the member 10 it projects beyond the forward end thereof to a slight extent. In commercial practice I prefer to wedge the sleeve slightly on the member 10, so that the two parts may be handled as a unit.

In setting the device to receive a screw, a hole or recess as 12 is drilled in a base 13, preferably to a depth equal to the length of the screw receiving member 10, and of diameter slightly larger than the greatest diameter of the insert. A sleeve 11 is then placed on the member 10 and the two parts are inserted jointly in the recess 12. By suitable application of pressure, (inward on the sleeve, outward on the part 10) or by driving the lead sleeve inward around the part 10, said sleeve is set around the member 10, expanding laterally as it is compressed and moved longitudinally, to secure an effective grip on both the member 10 and the side walls of the recess, and thereby to secure the member 10 in position. It is my preference that the sleeves 11 be so constructed that when tightly investing the forward portion of the member 10 and exerting an adequate retaining grip between the member 10 and the walls of the recess, its forward end shall be about flush with the end of the screw receiving member. Such a construction is illustrated in Fig. 2 in applied form.

It will be noted that the construction described affords a very efficient receiving member for suitable screws, indicated at 14. The bore of the screw receiving member 10 is preferably screw threaded from its extreme forward end so that the screw draft may begin at the plane of the surface of the base, and the screw employed need be no longer than is necessary for requisite strength and effective thread engagement. A long screw may, however, be employed, for it may extend clear to the bottom of the recess, the screw receiving member being open from end to end. It will be observed further that in the conoidal recess 20 there is provided a certain capacity—which in practice is ample—for the reception of dust or foreign matter that may reside in the base recess. For instance in drilling recesses in the slate base of an electrical switch board or the like, more or less of the drill-dust is apt to remain in the recesses, but under such circumstances it does not interfere with the proper seating of the member 10 nor does it prevent a long screw from going clear home. It will be noted that the annular base of the member 10 is narrow so that it may not readily be prevented from finding its way clear to the bottom of the recess, and of course the tapering inner wall of the bore-engagement tends to prevent such packing of dust as would prevent a long screw from reaching clear to the bottom of the base recess.

For inserts to be set in open holes as at 12' I prefer to use the construction shown in Figs. 3 to 5, employing in conjunction with a relatively short sleeve 11' a spring-metal retainer 25 in the form of a thin flat disk having a central opening 26 of diameter about that of the small extremity of taper 15. The annulus is preferably slit radially from its internal periphery, so as to form spring fingers 27 for easier operation. In setting such a device, there being no bottom for the member 10 to rest on, a compression tool, as T, is used, one of its elements screw engaging the member 10, and the other pressing on the disk 25 to drive it along the taper 15 as the compression action of the tool sets the sleeve 12' in the hole. The retainer buckles, on account of the tapering form of the member 10, and so it acts as a clutch to prevent member 10 from being driven rearwardly out of the set sleeve.

While I have herein described in some detail a specific structural form of my invention for full disclosure, it will be apparent that changes in the structural details might be made without departure from the spirit of my invention, within the scope of the appended claims.

Having described my invention, what I claim is:—

1. The combination of a rigid, centrally-apertured screw receiving member having its exterior surface tapering on two different angles, and a ductile sleeve encircling the same.

2. In a device of the character described, the combination of an internally threaded screw-receiving member, open axially from end to end with its axial opening threaded at its front end and enlarged at its rear end and exteriorly increasing in diameter from its front toward its rear end, and a ductile sleeve exteriorly coöperating with said member.

3. As an article of manufacture a screw holding insert consisting of a rigid shell, increasing in exterior diameter from one end thereof toward the other, axially open from end to end and having the front end portion of its axial opening screw threaded and the rear portion thereof flared.

4. As an article of manufacture a screw holding insert consisting of a rigid shell, increasing in exterior diameter from one end thereof toward the other, axially open from end to end and having the forward end of its axial opening screw threaded and its rearward end enlarged beyond the diameter of the screw threaded portion.

5. A screw holding insert member having an external configuration afforded by two conoidal portions of different pitch and a central bore extending from end to end thereof, a portion of the bore being screw threaded.

6. A screw holding insert member having an external configuration afforded by two conoidal portions of different pitch and a central bore extending from end to end thereof, the forward end of said central bore being screw threaded and the rearward portion thereof enlarged beyond the diameter of the threaded portion.

7. The combination of a tapering body, a ductile sleeve thereon, and a retainer on the body for interengaging coaction with said body and the sleeve.

8. The combination of a tapered screw-receiving member, a ductile sleeve thereon, and a flat annular retainer to interfit on the smaller end of said member, whereby compression of the sleeve and retainer may expand the sleeve and buckle the retainer to lock the parts against disconnection.

9. A screw holding insert member having an external configuration afforded by two conoidal portions of different pitch and a central bore extending from end to end thereof, the forward end of said central bore being screw threaded and the rearward portion thereof, lying within the conoidal portion of greatest pitch being conically enlarged beyond the diameter of the threaded portion.

10. A screw receiving insert comprising an exteriorly tapered internally threaded screw receiving member, a ductile sleeve thereon, and a retainer connecting the aforesaid parts to lock them against separation.

In testimony whereof I hereunto set my hand in the presence of two subscribing witnesses.

CHARLES N. ACKERMAN.

In the presence of—
 JOHN L. JOHNSON,
 GEORGE T. MAY, Jr.